Dec. 20, 1960 J. L. CASSELL 2,965,732
DETECTOR UNIT SWITCH CONSTRUCTION
Original Filed March 5, 1954 2 Sheets-Sheet 1

INVENTOR.
JOSEPH L. CASSELL
BY
ATTORNEY

Dec. 20, 1960     J. L. CASSELL     2,965,732
DETECTOR UNIT SWITCH CONSTRUCTION
Original Filed March 5, 1954     2 Sheets-Sheet 2
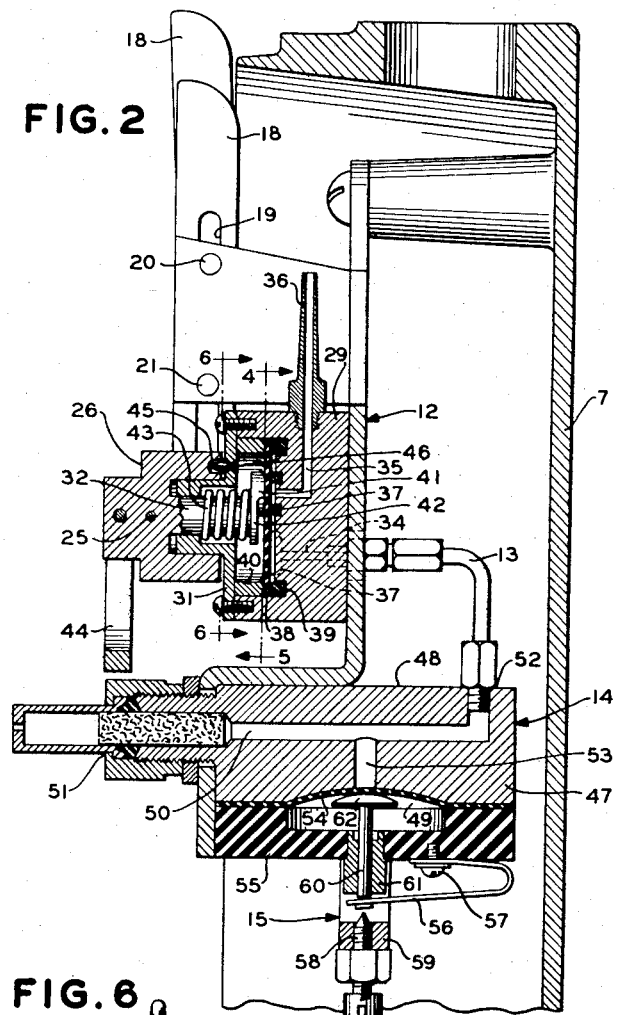
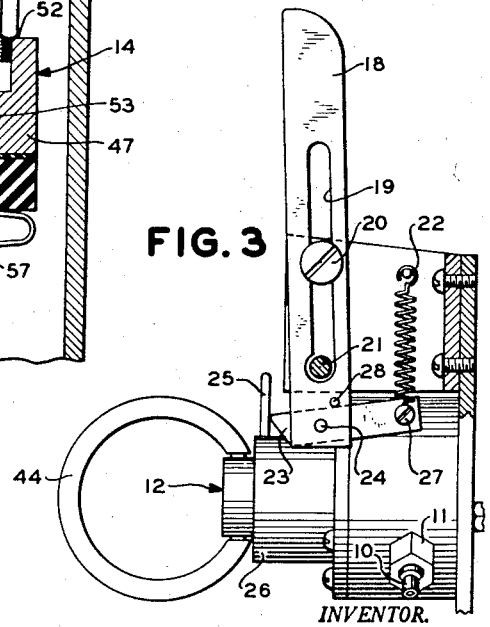
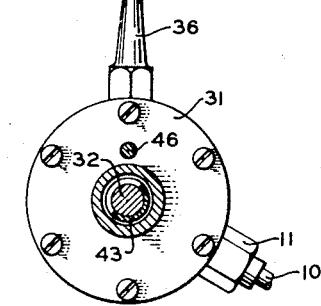
INVENTOR.
JOSEPH. L. CASSELL
BY
ATTORNEY

United States Patent Office 2,965,732
Patented Dec. 20, 1960

2,965,732

DETECTOR UNIT SWITCH CONSTRUCTION

Joseph L. Cassell, New York, N.Y., assignor to Automatic Fire Alarm Company, New York, N.Y., a corporation of New York Original application Mar. 5, 1954, Ser. No. 414,442, now Patent No. 2,842,758, dated July 8, 1958. Divided and this application Apr. 4, 1958, Ser. No. 726,540

2 Claims. (Cl. 200—83)

The invention herein disclosed relates to the detector units employed in aero tubing fire alarm systems and is particularly concerned with the switch mechanism of such units.

This invention is a division of that disclosed in copending patent application Serial No. 414,442, filed March 5, 1954, issued July 8, 1958, as Patent No. 2,842,758.

The detector units referred to consist usually of switch mechanisms actuated by diaphragms located at the ends of the tubing, and valve mechanism for testing the tubing and the action of the diaphragms and switch mechanisms, all protected within a wall box accessible only to authorized inspectors and servicemen.

Objects of the present invention are to thoroughly safeguard these parts and mechanisms, to avoid leaks at the valves and diaphragms and to assure proper handling and sequence of operations in the inspection and testing of the apparatus.

Specifically it is an object of the invention to insure that the system will be instantly put on test so as not to send in a false alarm when the box is opened, and to automatically return the system to normal operation when the box is closed, and further to make certain that the box will not be closed until the testing equipment has first been set back to normal operation.

In the accomplishment of these objects a switch for shifting from normal to test and from test back to normal operation, is provided, operable by opening and closing movements of the door, and an interlock for preventing closing of the door is provided, arranged to be held back by the test valves but only when these valves have been restored to normal operating position.

The test valves are of novel construction, free of sliding or rotatively engaging valve parts so as to avoid wearing and leakage, and the diaphragms are mounted on one-piece bases, free of screw or plug-closed openings such as have heretofore occasioned leaks in the system.

Other novel features of the invention and further desirable objects accomplished are set forth and will appear in the course of the following specification.

The drawings accompanying and forming part of the specification illustrate a present practical embodiment of the invention. Structure, however, may be modified and changed as regards the immediate illustration, all within the true intent and scope of the invention as hereinafter defined and claimed.

Fig. 1 in the drawings is a front elevation of one of the new detector units showing the box opened and the automatic change-over switch released by the cover and converting the electrical system from normal to test operation;

Fig. 2 is an enlarged broken sectional view on substantially the line 2—2 of Fig. 1, through one of the diaphragm chambers and test valves, and showing one cover stop projected and the other retracted, the same as indicated in Fig. 1;

Fig. 3 is a further enlarged broken sectional view showing one of the test valves turned to a testing position, releasing the cover stop associated therewith;

Figs. 4 and 5 are cross-sectional views of one of the test valves taken on substantially the plane of line 4—5, looking in opposite directions in the two views;

Fig. 6 is a cross-sectional detail on substantially the plane of line 6—6 of Fig. 2.

Figures 1, 1A:
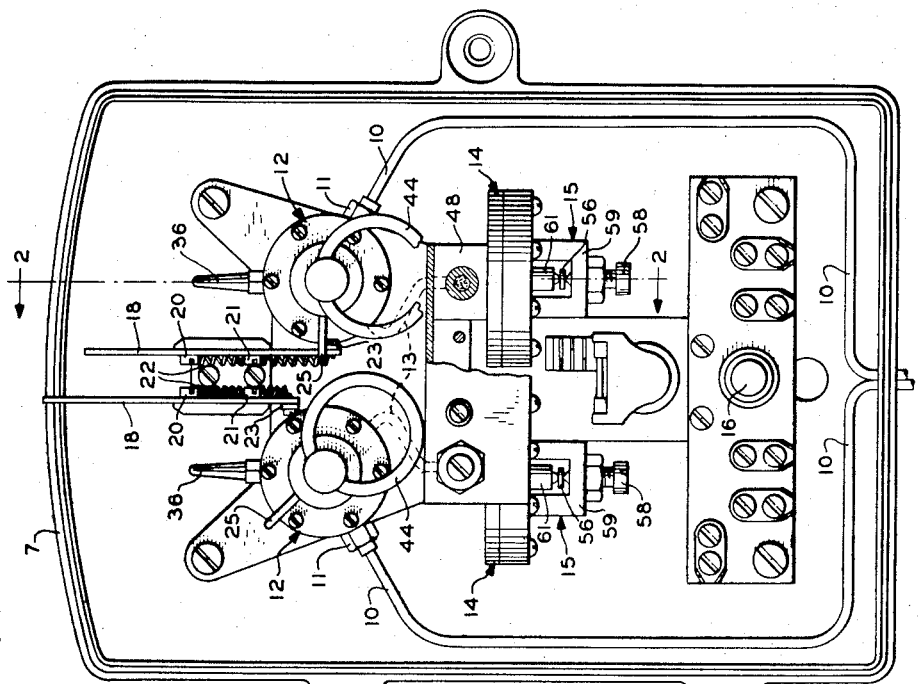
Fig. 1a is a broken sectional detail showing the cover of the box closed and the projection on the inside of the cover holding the switch in the normal operative position.

In the general view, Fig. 1, a wall box is indicated at 7, having a hinged cover 8 which can be secured or released by a special screw 9 operable only by a wrench key issued to authorized servicemen and inspectors.

The ends of the aero tubing 10 are shown brought into the box and connected at 11 with the two test valves 12. From the back of these valves connections 13 lead to the diaphragm chambers at 14. The signal switches actuated by the diaphragms are indicated at 15.

The change-over switch for holding the system on normal signal operation when the box is closed and for automatically shifting over to testing circuit operation when the box is opened, is shown at 16 in Figs. 1 and 1a, in the form of a push-button switch mounted on the back of the box, in position to be engaged and actuated by the stud 17 projecting from the inner face of the cover. This is a spring actuated switch connected and arranged to close the normal operating circuits when the push-button is forced inwardly against the spring tension of the switch by closing of the door, and to open these circuits and close the testing circuit or circuits when pressure on the button is released on the opening of the cover.

The stops for preventing closing of the cover until the test valves have been restored to normal operation position, are indicated at 18 in the form of slides longitudinally slotted at 19 and thereby guided over screw pins 20, 21, these slides being projected by springs 22 to extend over the edge of the box, and being held retracted by triggers or latches 23 pivoted on the inner ends of the slides, at 24, in position to catch behind the pins 25 projecting radially from the rotatable stem portions 26 of the test valves.

The slide projecting springs 22 are shown connected at 27, Fig. 3, with the free ends of the triggers 23 to serve the double purpose of projecting the slides and of rocking the triggers on their pivots so that the inclined latching ends of these elements may pass behind the holding pins 25 and then hold thereagainst if the valves are in the holding position, as shown at the right in Fig. 1. Stop lugs or pins 28 on the slides limit the extent of rocking movement of the latches or triggers 23 under pull of the springs 22.

In the illustration the triggers, latch levers or catches 23 will engage the pins 25 to hold the slides retracted, clear of the edge of the box, only when the test valves are in the normal operating position, as shown at the right in Fig. 1. In any other position of the test valves the slides will not be held back and will project to prevent closing of the cover, as shown at the left in Fig. 1. It follows, therefore, that both test valves must be restored to normal operating position and both slides associated with those valves be forced back into the box and caught by the retainers 25 before the cover can be closed and hence before the change-over switch will be operated by the cover to restore the system to normal operation.

The test valves are shown as made up each of a body of case 29 having a cylindrical chamber 30 in the front of the same, closed over by cover 31 in which a valve stem 32 is rotatably and slidingly mounted.

Three ports are entered in the back of the chamber 30, one designated 33 connected with the end of the aero tube 10, a second one, 34, providing entrance to the tube connection 13, and the third, 35, connected with the test spout or nozzle 36 on the side of the valve casing.

These ports are equally spaced in respect to the center of rotation of the valve stem and are each surrounded by a small circular O-ring 37. A limp diaphragm 38 overlies these three ports and is held sealed at its rim against a larger O-ring 39 by a clamping ring 40 secured in the chamber by the cover.

The diaphragm 38 is pressed into engagement with any one of the three port sealing rings 37 by a circular pad 41 of slightly larger size than these O-rings, on the end of a radial arm 42 at the inner end of the valve stem 32.

A spring 43 about the inner end of the valve stem and between the radial arm 42 and the inner face of the cover, serves to hold the valve stem inwardly with the pad 41 pressing the diaphragm firmly over the O-ring surrounding the valve port with which the radial arm is aligned and which, in Fig. 2, is the port 35 leading to the test spout 36. Hence in this particular situation the test spout is closed off and the other two ports are open, provided free communication between the end of the aero tube and the tubing extending to the switch actuating diaphragm.

Convenient operation of the test valves is afforded by rings 44 engaged with the head portions 26 of the valve stems. Fig. 2 shows how the spring 43 holds the valve stem inwardly with the pad at the inner end of the same pressed solidly over a valve port seal and with an indexing socket 45 on the head engaged over an indexing pin 46 on the cover.

In this particular illustration three indexing sockets 45 are provided in the head to locate and hold the valve stem in position with the pad closing one of the three ports in the valve casing.

To unlock and turn the valve stem to any other position, it is necessary to first pull out the valve stem sufficiently to disengage the indexing elements 45, 46. This movement withdraws the pad from engagement with the diaphragm. The stem may then be turned to any one of the other valve positions and again be locked by engagement of the indexing elements at that location.

Thus the test valves are locked in each of the test or operating positions and cannot be turned until they are pulled outward and unlocked by disengagement of the indexing detents. When turned to a new location the valve closing action will be a straight line movement closing the diaphragm over the valve port O-ring.

With this construction, therefore, the valve is closed leak-tight in each position and the change from one position to another is effected without rubbing or wiping engagement of valve parts.

The rings 44 afford proper grip of the fingers for the pulling and turning valve movements and for indexing the valve from one position to another.

To avoid the possibility of leakage at the working diaphragms, the base structure for such diaphragms is shown as consisting in each case of a single disc 47 having an integral rib or ridge 48 across the top of the same, the lower face of the disc being concaved at 49 to form the arched roof of the diaphragm chamber and the ridge portion being bored in through the front end, at 50, to take the pressure compensating "leak" 51, and bored down from the top at the opposite end, at 52, to receive the pressure connection 13, and bored up from the bottom, at 53, into the cross channel 50 to admit pressure to the diaphragm. This channel thus serves as a terminal passage for the aero tubing.

The diaphragm 54, preferably of limp material, is shown clamped airtight against the rim of the base member by an annular member 55 of insulating material, to form the insulating base for the switch contacts.

In the illustration the switch contacts are shown provided by a return bent spring 56 secured to the insulating base plate 55, at 57, and a pointed contact screw 58 adjustably secured in an arched bracket 59 mounted on the base.

The free end of contact spring 56 is engaged at the inner side by the stem of a plunger 60 operating freely in a guide 61 and having an arched head 62 engaging the center of the diaphragm and normally holding it pressed upward, closing the central passage 53 in the roof of the chamber.

In this construction, with the diaphragm chambers normally closed, the aero tubing is kept in a more sensitive state since there are no cushions of air at the ends of the tubing to absorb the effects of expansion of air in the tubing. The diaphragms are therefore ready to act to close the switches immediately upon expansion of air in the tubing caused by sudden rise of temperature.

The test valves illustrated provide for all the usual or special testing of the equipment and they can be relied upon to maintain leakproof conditions, since there is no wearing of the valve parts. Similarly, the switch actuating diaphragms can be relied upon to maintain their sensitive and airtight condition.

The automatic change-over switch and the interlock between the door stops and test valves assures that upon opening the door the system will be switched over from normal to test and that the door may not again be closed until the test valves have been restored to normal operating position.

The soft, loose and flexible character of the limp diaphragms 54 enables the relatively light switch springs 56 to hold these diaphragms 54 arched upward against the domed roofs of the expansion chambers, covering and closing the ends of ports 53, thus eliminating cavities at the ends of the aero tubing under normal conditions. The absence of such cavities at the ends of the tubing assures that the "leak" time will always be the same, a desirable condition heretofore unattainable with the use of metallic diaphragms which, because of their relatively stiff and non-conforming character, cannot act as close-fitting covers to seal off the ends of the tubing.

Pressure in the aero tubing caused by a sudden rise in temperature from a fire distends the diaphragm 54 to close the signal circuit at switch points 56, 58.

In making tests the inspector pumps up pressure through nozzles 36 to distend the diaphragms and close circuits through the diaphragm switches at 56, 58.

What is claimed is:

1. An aero detector unit comprising diaphragms for connection with opposite ends of the aero tubing accompanying such a unit, a base for each diaphragm in the form of a rigid disc having an integral rib across the top of the same, the lower face of said disc being hollowed to form the arched roof of a diaphragm chamber, said base having a longitudinal opening entered in the front of said rib, a passage extending from said roof of the diaphragm chamber up into said opening and an air passage into the top of the opening, said diaphragm being of limp formation and engaged over the lower face of said base, an annular member of insulating material sealing the rim of the diaphragm against the rim portion of the base, a plunger guided in said member and having a rounded head, a spring switch contact mounted on said insulating member and holding said plunger raised with the rounded head of the same supporting the limp diaphragm against the arched roof of the diaphragm chamber closing said passage extending from the roof of the diaphragm chamber up into said opening, a pressure compensating "leak" secured in said opening in the front of the rib, aero tubing connected with said opening in the top of the rib and a relatively stationary switch contact below said spring switch contact in insulated relation and engageable thereby under pressure developed in said aero tubing acting downwardly on said limp diaphragm.

2. An aero detector switch unit comprising the combination with aero tubing, of a base having a terminal passage to which the end of said aero tubing is connected, said base having an upwardly arched lower face hollowed to form the arched roof of a diaphragm chamber and having a port at the center of said arched roof open to said aero tubing terminal passage in the base, a flexible limp diaphragm sealed to said arched roof portion of the base and forming the flexible wall of a diaphragm chamber, said flexible diaphragm being engageable on upward movement with said arched roof to close said port at the center of the same, a plunger guided for vertical movement beneath said diaphragm and having a head at the upper end of the same engaging the center of the diaphragm for lifting the same into port closing position, a bowed switch spring having a free end portion engaging the lower end of said plunger and yieldingly supporting said plunger upraised in position holding the diaphragm in the port closing relation and yieldable to pressure developed in the aero tubing to permit downward flexure of said diaphragm and a relatively stationary switch contact positioned for engagement by said free end portion of said plunger and diaphragm supporting spring.

References Cited in the file of this patent

UNITED STATES PATENTS

| | | |
|---|---|---|
| 1,271,220 | Quinn | July 2, 1918 |
| 1,340,646 | Anderson | May 18, 1920 |
| 1,750,341 | Aichele | Mar. 11, 1930 |
| 2,078,441 | Carlson | Apr. 27, 1937 |
| 2,842,758 | Cassell | July 8, 1958 |

FOREIGN PATENTS

| | | |
|---|---|---|
| 97,348 | Austria | June 25, 1924 |